Sept. 2, 1969  L. SCHWARTZ  3,465,092
MULTI-SHIELDED CABLE GROUNDING CONNECTOR
Filed Dec. 4, 1967
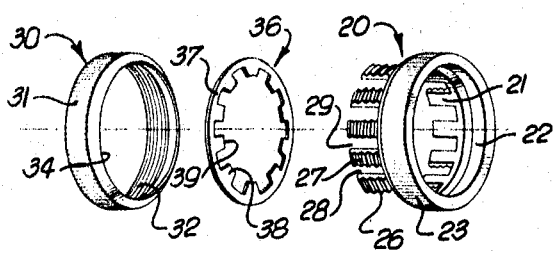
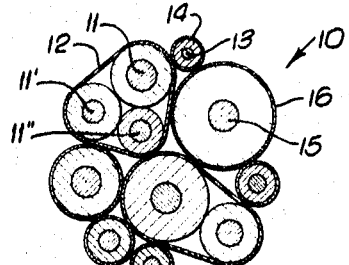
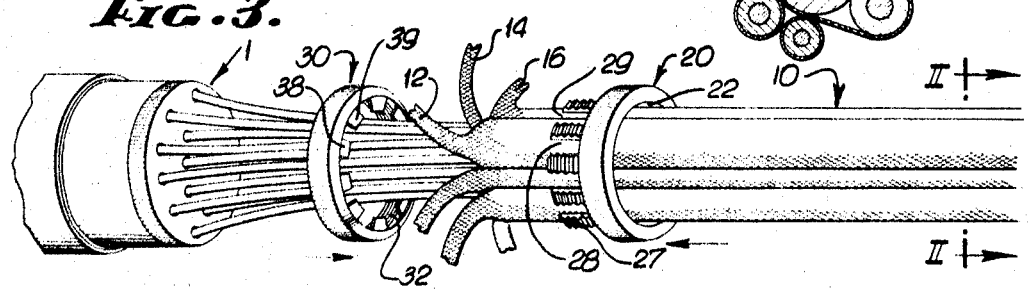
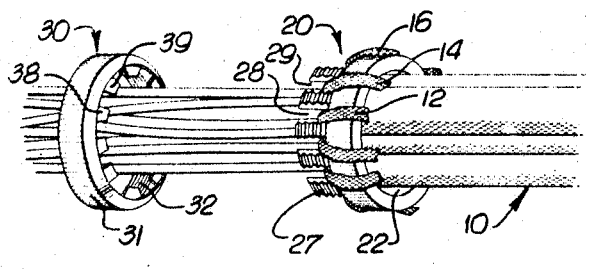
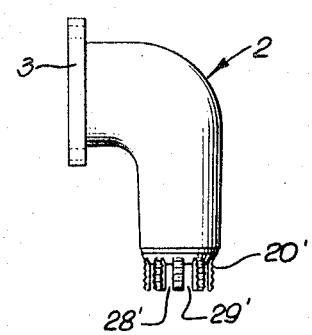
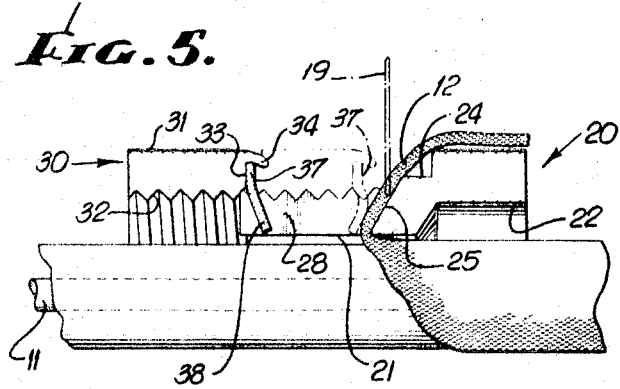
INVENTOR.
LAWRENCE SCHWARTZ
BY
Miketta, Glenny, Pons & Smith
ATTORNEYS.

United States Patent Office 3,465,092
Patented Sept. 2, 1969

3,465,092
MULTI-SHIELDED CABLE GROUNDING CONNECTOR
Lawrence Schwartz, Monterey Park, Calif., assignor to Glenair, Inc., Glendale, Calif., a corporation of California
Filed Dec. 4, 1967, Ser. No. 687,666
Int. Cl. H02g *15/02, 15/08;* H01r *13/54*
U.S. Cl. 174—78                8 Claims

ABSTRACT OF THE DISCLOSURE

Terminal and grounding connector assembly for bundles of electrical leads or shielding, comprising a cylindrical, externally threaded element with a plurality of spaced longitudinal slots, and a driving ring in threaded engagement with the cylindrical element, the driving ring rotatably carrying a contact annulus provided with a plurality of contact sections, each contact section extending into a slot, rotation of the ring moving the annulus and contact sections toward the end of slots to position and hold leads or shielding. Externally threaded element may be part of a plug, adapter, bulkhead fitting, coupling or other fixture.

BACKGROUND OF THE INVENTION

In numerous electrical systems wherein the connecting means include a harness or the like provided with a number of bundles of cables, such cables may be required to pass into adapters, plugs and other connecting devices, and the leads of the cables must be individually attached to such components. It is normally of the greatest importance to minimize and preferably eliminate cross-talk from one lead to another in such a bundle of cables, and provision is accordingly made for shielding or grounding individual cables or, occasionally, sub-bundles or groups of several insulated leads, among which cross-talk is not objectionable. Since cables in such bundles and sub-bundles need not be of a uniform size, and typically are of widely different sizes and numbers of individual leads, the prior lack of means which would provide individual grounding means for cables of different sizes requiring a common ground, has necessitated the use of bulky adapters, as well as the use of special tools for assembling and disassembling them. Similar problems and deficiencies obtain where a terminal connector is needed. As a result, the cost of assembly has been high, and weight problems have been aggravated. Weight reduction is obviously of great importance in airborne installations, such as an airplane, a missile or a spacecraft.

SUMMARY OF THE INVENTION

The present invention provides a simple, positive, multi-purpose lightweight connector assembly which can be used as a terminal or for grounding, either alone or as a part of a plug or other fitting. When used for grounding, each of a plurality of grounding conductors in a bundle of cables, the ground connections are made simply by stripping the grounding sheath from the end portion of each of the insulated leads or groups of leads in the cable bundle, inserting such stripped sheath or shielding braid end portions in slots formed in a grounding ring in accordance with the invention, and intimately engaging the grounding conductor or sheath end portions by resiliently biased fingers or contact sections of a contact annulus made of material of high conductivity, and forcing the contact annulus sections into intimate, minimum resistance contact with the grounding conductor end portions. It is to be especially noted that the grounding connector in accordance with the present invention can be assembled and disassembled without the use of tools, and that individual grounding lines can be added to the assembly, or removed from the assembly as desired, thereby enhancing the flexibility of use of the connector and application thereof to circuit components subject to occasional modification.

Preferred forms of the invention have been selected for illustration, and will be described in connection with the accompanying drawings.

DESCRIPTION OF THE DRAWING

FIG. 1 is an exploded view showing the important elements in perspective, namely, the male member or grounding ring, the contact annulus, and the retainer nut or driving ring;

FIG. 2 is a sectional view taken on the arrows II—II of FIG. 3 showing a typical arrangement of shielded and insulated leads, within a cable, with some leads being grouped in two's and three's within common shielding sheaths;

FIG. 3 is a perspective view showing a bundle of individually shielded leads or a cable connected to a plug, with a grounding assembly on the cable at an intermediate stage of providing a common ground;

FIG. 4 is a perspective view showing a subsequent stage in the position of the grounding or shielding braids before completion of a common ground;

FIG. 5 is an enlarged, longitudinal section of the circumferential portion of the assembly, showing the component parts of the present invention as they are brought into assembled relation on the cable, the retainer or driving ring and the contact annulus being shown in solid lines in partially assembled relation with the grounding ring, and in dotted outline in fully assembled relation; one grounding conductor or sheath being shown, together with the end portion of an insulated lead which may optionally be used in the practice of the present invention;

FIG. 6 is a side elevation of one form of adapter or bulkhead fitting wherein the male component of the assembly is an integral part of the fitting.

The important elements of my multi-purpose connector are shown in exploded form in FIG. 1. As there indicated, the male body member 20 is provided with a bore 21 adapted to receive a bundle of cables. The larger end of the member 20 is provided with a counterbore 22, this larger end being shown with a serrated or knurled outer surface 23. A reduced step portion 24 is interposed between the enlarged end of the member 20 and a thin-walled end section 26, this end section being externally threaded as indicated at 27. This thin-walled externally threaded section is provided with longitudinally extending circumferentially spaced slots, such as 28 and 29. Each of this arcuately spaced longitudinal slots is preferably open at the rear end and closed adjacent the forward end of bore 21 by an inclined face 25, leading to the step 24 (see FIG. 5). Preferably, the castellated externally threaded portions are of equal arcuate extent to the intervening spaces or slots 28, 29, but this is not necessary for the effective practice of the present invention.

The other important cooperating element of my assembly constitutes the retainer or driving ring 30 shown provided with an externally roughened outer surface 31 and an inner threaded surface 32, the threads being adapted to cooperatively engage the external threads 27 of the male member 20. The driving ring 30 is provided with a frontal annular shoulder 33 and an outer retaining lip 34, said shoulder and lip being adapted to removably retain a contact annulus 36. The contact annulus has a continuous outer circumferential rim 37 and a plurality of inwardly extending spaced fingers 38, 39 and the like, spaced from each other by a plurality of intervening slots, each of the fingers being adapted to be received in one of the slots of the male body member 20. Moreover, for reasons later appearing, it is desirable that each of the contact fingers 38, 39, etc. be inclined or bent forwardly from the plane of the rim 37; the entire contact annulus is preferably integrally formed from thin resilient material of high electrical conductivity such as a copper alloy, tempered beryllium copper being exemplary. In commercial practice, the contact annulus 36 is sprung into the recess formed by the retaining lip 34 and the shoulder 33 so that it is rotatably held within the retainer or driving ring 30, the customer receiving simply two parts, namely, the male body member 20 and the retainer or driving ring 30 with its contact annulus therein.

One method of utilizing the assembly of the present invention in providing a common ground for a bundle of electrically conducting leads will now be described. FIG. 3 shows a multi-strand cable 10 whose various leads are to be connected (and are shown connected) to a plug, jack, connector, adapter, etc. indicated at 1. Prior to the attachment of the various leads to the plug or connector, the two major elements of my assembly, namely, the male body member 20 and the retainer or driving ring 30 with its contact annulus are placed around the cable, the castellated or slotted portion of the male body member facing toward the terminal end of the cable and the plug, jack or connector.

It is not necessary that all of the leads in the bundle of cable 10 be of the same gauge. FIG. 2 is a cross-section of a cable 10 and it will be noted that such cable contains a plurality of leads, some with individual shielding and others having a joint shielding for two or three cables. Moreover, the individual leads may differ in gauge. It will be noted that insulated leads 11, 11' and 11" form a component bundle having a common ground or shielding braid 12. Other leads may be individual as 13 and 15 and may be of different gauge; these may be provided with individual shieldings, such as 14 and 16, respectively. The device of the present invention is capable of forming a reliable and secure grounding connection between and among a plurality of sheaths of varying sizes.

With the two major elements 20 and 30 of my connector in spaced relation but in proximity to the terminal end of the cable 10, the outer or ground jackets are stripped from the ends and are "picked" radially outward, the shielding braids such as 12, 14 and 16 being pulled radially outward through different slots such as 28, 29 and the like of the male member as clearly shown in FIG. 3.

These terminal portions of the grounding or shielding braid are then bent backwards over the body portion of the male member 20 and preferably trimmed. If desired, a pigtail or drain wire, such as 19, may also be inserted or placed in contact with the inclined closed face 25 of the male body member 20. The retainer or driving ring 30 is now slid toward the male body member and rotated into threaded engagement with the externally threaded castellated portion thereof. The spaced fingers 38, 39 etc. of the contact annulus 36 extend into the slots 28, 29, etc. of the male body member 20 and are moved longitudinally therealong toward the closed ends of said slots by the rotation of the driving ring with respect to the body member. As most clearly shown in FIG. 5, the fingers 38 and 39 are forwardly inclined, but as the driving ring reaches the end of its travel, these fingers may bend backward, while exerting resilient pressure against the braid or shielding, and are therefore adapted to make definite positive contact with such braid or shielding irrespective of its thickness and irrespective of the disparity between the thickness of braid in one slot in comparison with the thickness of braid extending through another slot. Moreover, the retaining lip 34 also assists in insuring a tight contact and a lock between the two cooperating members 20 and 30 and whatever braid or lead is therebetween.

It will be evident that all of the shielding braid from all of the component leads or subsidiary bundles of leads within the cable 10 has been provided with a common ground consisting of the male body member, the retaining ring and the contact annulus. If desired, the entire assembly may be covered with a short length of heat shrinkable tubing or a potting compound. In some instances it may be desired to place a lock wire around the two screwed together members 20 and 30 to insure against accidental loosening of the clamp nut.

It is to be understood that the male body member 20 may be an integral part of a fitting, adapter or some other piece of hardware. For example, in FIG. 6 a bulkhead fitting 2 is illustrated, this being of the 90° type and provided with a flange 3 for attachment to a bulkhead. Instead of a flange, the fitting could be provided with threads, nuts, clamps or other forms of construction conforming with military specifications. At all events, the end of the fitting is shown provided with a male body member 20' having the externally threaded thin-walled surface provided with longitudinally extending slots 28', 29' and the like adapted to cooperate with a retainer or driving ring with its contact annulus similar to the ring and annulus 30 and 36 hereinbefore described. The present invention contemplates the integration of the assembly hereinabove described with any of the commonly employed fittings, adapters, plugs, etc.

Moreover, the assembly hereinbefore described is also capable of being used as a straight terminal connector. In some installations, several lighter gauge unshielded leads need be connected to one or more heavier gauge leads, which in turn, are to be connected to a power source, bus bar, etc. The device of this invention is extremely effective as a gathering or terminal ring in such installation and the longitudinally slotted element may be an integral part of an adapter sleeve, conduit coupling, bulkhead fitting, stuffing tube assembly, assembly clamp or the like. When used as a terminal, the leads in a conductor are themselves radially pulled through the slots of the male fitting so as to make contact with the male member and the retainer ring and contact annulus and the terminal of one or more heavier gauge leads may be similarly extended through a slot or slots and the entire group firmly held together by the members 20 and 30. For example, twelve No. 24 gauge wires may come into such a terminal assembly and only one 12 gauge wire go out therefrom. Any such terminal connection is of course covered with adequate electrical insulation.

It must also be mentioned that although reference has been made to casting or integrally forming the male element 20 as a part of an adapter or fitting, such male body member 20 may also be provided with internal or external threads at the end opposite the castellated or slotted end and threadedly connected (or as by means of a clamp or bayonet joint), to a desired fitting or housing.

I claim:
1. A device for removably holding a plurality of electrical conductors, each carrying a grounding line, in a compact bundle and for insuring a grounded connection for the grounding lines, comprising:
  a male body portion having an axial bore, a thin-walled end portion and an opposite end portion;
  said thin-walled end portion being externally threaded and having a plurality of arcuately spaced slots formed therein, said slots being open at the end of said thin-walled portion, and closed adjacent the opposite end;
  a tempered spring metal contact annulus, including a rim and a plurality of integral, inwardly directed individual contact sections, each section being adapted to extend into a separate slot, said sections being inclined and biased out of the plane of the rim of said annulus toward the closed end of said slots; and
  a driving ring threadedly mounted on said thin-walled portion for axially moving the contact annulus, and for holding said annulus in grounding engagement with grounding lines disposed between the individual contact sections and portions of the male body portion.

2. The invention as defined in claim 1, wherein said driving ring has formed therein a forwardly directed lip and annular shoulder for movably retaining therein the outer circumferential marginal rim of said annulus.

3. A device as stated in claim 1 wherein the enlarged end portion of the male body portion is provided with an enlarged counterbore and said counterbore is internally threaded.

4. A terminal and grounding assembly for use with a plurality of conductors arranged in a bundle comprising:
   a tubular male member having an annular base portion and an externally threaded castellated portion extending rearwardly from the base and provided with a plurality of arcuately spaced slots formed therein;
   a tubular retainer and driving ring having an internally threaded base portion and an annular groove disposed forwardly thereof and of a greater diameter than the maximum inside diameter of the threaded base portion; and a contact annulus of high conductivity material including a rim receivable in said groove and a plurality of arcuately spaced fingers formed integrally with the rim and projecting inwardly therefrom, the fingers being receivable in said slots when the ring and male member are in threaded engagement.

5. The invention as defined in claim 4 wherein said contact annulus is formed of thin resilient material.

6. The invention as defined in claim 4 wherein said fingers are resilient, and are biased forwardly of the plane of the rim.

7. An assembly as stated in claim 4 wherein said spaced slots extend longitudinally of the rear portion and are open at the rear end thereof and closed by an inclined shoulder adjacent the base portion.

8. In combination with a fitting, adapter and the like: a male member provided with a bore adapted to receive a bundle of conductors, said male member being provided with a base portion and a tubular externally threaded portion provided with a plurality of longitudinally extending arcuately spaced slots therein, said slots being closed adjacent said base portion;
   a tubular retainer and driving ring having an internally threaded base portion and an annular groove disposed forwardly thereof and of greater diameter than the maximum inside diameter of the threaded base portion, said internal threads being adapted to engage the external threads of the male member; and a contact annulus of high conductivity material including a rim receivable in said groove and a plurality of arcuately spaced fingers formed integrally with the rim and projecting inwardly therefrom, the fingers being receivable in said slots when the ring and male member are in threaded engagement, said finger being adapted to contact and grasp conductors extending radially through said slots and to press said conductors against the closed ends of said slots.

References Cited

FOREIGN PATENTS 862,622   3/1961   Great Britain.

DARRELL L. CLAY, Primary Examiner

U.S Cl. X.R.

174—89; 339—103, 89